(12) United States Patent
Joo et al.

(10) Patent No.: US 11,895,616 B2
(45) Date of Patent: Feb. 6, 2024

(54) ELECTRONIC DEVICE AND METHOD FOR MEASURING LOCATION OF ELECTRONIC DEVICE

(71) Applicant: SAMSUNG ELECTRONICS CO., LTD., Gyeonggi-do (KR)

(72) Inventors: Sungjung Joo, Gyeonggi-do (KR); Jongho Kim, Gyeonggi-do (KR); Kyonggon Choi, Gyeonggi-do (KR); Yunwoo Lee, Gyeonggi-do (KR); Seongmin Je, Gyeonggi-do (KR)

(73) Assignee: Samsung Electronics Co., Ltd

( * ) Notice: Subject to any disclaimer, the term of this patent is extended or adjusted under 35 U.S.C. 154(b) by 193 days.

(21) Appl. No.: 17/286,975

(22) PCT Filed: Oct. 17, 2019

(86) PCT No.: PCT/KR2019/013617
§ 371 (c)(1),
(2) Date: Apr. 20, 2021

(87) PCT Pub. No.: WO2020/085712
PCT Pub. Date: Apr. 30, 2020

(65) Prior Publication Data
US 2021/0392613 A1 Dec. 16, 2021

(30) Foreign Application Priority Data
Oct. 25, 2018 (KR) .......................... 10-2018-0128008

(51) Int. Cl.
*H04W 64/00* (2009.01)
*G01S 19/43* (2010.01)

(52) U.S. Cl.
CPC .......... *H04W 64/006* (2013.01); *G01S 19/43* (2013.01)

(58) Field of Classification Search
CPC ....... H04W 64/00; H04W 4/02; H04W 4/029; H04W 64/003; H04W 4/025;
(Continued)

(56) References Cited

U.S. PATENT DOCUMENTS

2004/0203853 A1* 10/2004 Sheynblat .............. G01S 1/026
455/12.1
2009/0189810 A1 7/2009 Murray
(Continued)

FOREIGN PATENT DOCUMENTS

KR 1020150082390 7/2015
KR 1020160009277 1/2016
(Continued)

OTHER PUBLICATIONS

PCT/ISA/210 Search Report issued on PCT/KR2019/013617, dated Jan. 29, 2020, pp. 5.
(Continued)

*Primary Examiner* — Kwasi Karikari
(74) *Attorney, Agent, or Firm* — The Farrell Law Firm, P.C.

(57) ABSTRACT

According to various embodiments, an electronic device comprises: a housing; a touchscreen display viewed through a part of the housing; at least one communication module located inside the housing; a processor located inside the housing and operationally connected to the display and the at least one communication module; and a memory located (Continued)

inside the housing and operationally connected to the processor, wherein the memory is provided to store a location measurement map, and can store instructions allowing, when executed, the processor to check the location of the electronic device by using the communication module, determine a block corresponding to the location of the electronic device on the location measurement map on the basis of at least a portion of the checked location of the electronic device, determine the location measurement method on the basis of at least a portion of priority information about a position source for the determined block and position source information about the electronic device, and measure the final location of the electronic device by means of the determined location measurement method by using the communication module. Other embodiments are possible.

12 Claims, 12 Drawing Sheets

(58) Field of Classification Search
CPC ....... H04W 12/63; H04W 36/32; H04W 4/33; H04W 88/02; H04W 4/024; H04W 88/08; H04W 56/006
See application file for complete search history.

(56) References Cited

U.S. PATENT DOCUMENTS

| | | | |
|---|---|---|---|
| 2010/0291947 A1* | 11/2010 | Annamalai | H04W 36/385 |
| | | | 342/357.31 |
| 2011/0176523 A1 | 7/2011 | Huang et al. | |
| 2012/0150434 A1 | 6/2012 | Cho et al. | |
| 2014/0129175 A1 | 5/2014 | Poduri et al. | |
| 2014/0349675 A1 | 11/2014 | Schatzberg et al. | |
| 2015/0045072 A1* | 2/2015 | Chao | G01S 19/42 |
| | | | 455/456.6 |
| 2015/0100589 A1 | 4/2015 | Hassan et al. | |

FOREIGN PATENT DOCUMENTS

| | | |
|---|---|---|
| KR | 1020160065115 | 6/2016 |
| KR | 101713035 | 3/2017 |
| KR | 101779966 | 10/2017 |

OTHER PUBLICATIONS

PCT/ISA/237 Written Opinion issued on PCT/KR2019/013617, dated Jan. 29, 2020, pp. 5.
Korean Office Action dated Jul. 31, 2023 issued in counterpart application No. 10-2018-0128008, 11 pages.

* cited by examiner

| POSITION SOURCE | RELIABILITY SCORE |
|---|---|
| L1 GNSS | 4 |
| L5/E5 GNSS | 7 |
| WIFI Positioning System | 5 |
| Cell id Positioning | 1 |
| RTK GNSS | 4 |

ELECTRONIC DEVICE AND METHOD FOR MEASURING LOCATION OF ELECTRONIC DEVICE

CROSS-REFERENCE TO RELATED APPLICATION(S)

This application is a National Phase Entry of PCT International Application No. PCT/KR2019/013617, which was filed on Oct. 17, 2019 and claims priority to Korean Patent Application No. 10-2018-0128008, which was filed on Oct. 25, 2018 in the Korean Intellectual Property Office, the contents of which are incorporated herein by reference.

BACKGROUND

1. Field

Various embodiments of the disclosure relate to an electronic device and a method for measuring the location of the electronic device.

2. Description of the Related Art

Location measurement methods include a location measurement method using a global navigation satellite system (GNSS), a location measurement method using Wi-Fi, and a location measurement method using a cell ID, and priority is basically assigned to the location measurement methods.

The priority regarding the location measurement methods is, in terms of accuracy, in the order of: the location measurement method using the GNSS, the location measurement method using the Wi-Fi, and the location measurement method using the cell ID. If location measurements by all location measurement methods succeed, the result of the location measurement method using the GNSS is commonly selected.

SUMMARY

Location information has recently been used in many kinds of electronic devices, and the accuracy thereof has become increasingly important according to the purpose of use. The location measurement method using GNSS is, in most cases, most accurate in open fields, but may provide users with inaccurate information, due to the multi-path, in downtown areas with many buildings, thereby degrading the service quality. In addition, the location measurement method using Wi-Fi may provide inaccurate location information in a special situation in which AP-related location information received through Wi-Fi communication is potentially inaccurate.

Various embodiments may provide an electronic device and a method for measuring the location of the electronic device, wherein a location measurement method can be selected such that accurate location information can be provided at the current location of the electronic device in a situation in which location information provided to the electronic device is inaccurate due to an external factor (for example, multi-path in downtown areas).

According to various embodiments, an electronic device may include: a housing; a touchscreen display configured to be visible through a portion of the housing; at least one communication module configured to be located in the housing; a processor configured to be located in the housing and to be operatively connected to the display and the at least one communication module; and a memory configured to be located in the housing and to be operatively connected to the processor. The memory may be configured to store a location measurement map and stores instructions that, when executed, cause the processor to; identify a location of the electronic device using the communication module; determine a block corresponding to the location of the electronic device in the location measurement map at least partially based on the identified location of the electronic device; determine a location measurement method at least partially based on priority information of a position source for the determined block and position source information of the electronic device; and measure a final location of the electronic device by the determined location measurement method using the communication module.

According to various embodiments, a method of measuring a location of an electronic device may include: identifying the location of the electronic device; determining a block corresponding to the location of the electronic device in a location measurement map at least partially based on the location of the electronic device; determining a location measurement method at least partially based on priority information of a position source for the determined block and position source information of the electronic device; and measuring a final location of the electronic device using the determined location measurement method.

According to various embodiments, accurate location information may be provided to a user by using the most accurate location source method at the current location of an electronic device, regardless of external factors.

DETAILED DESCRIPTION

Figure 1:
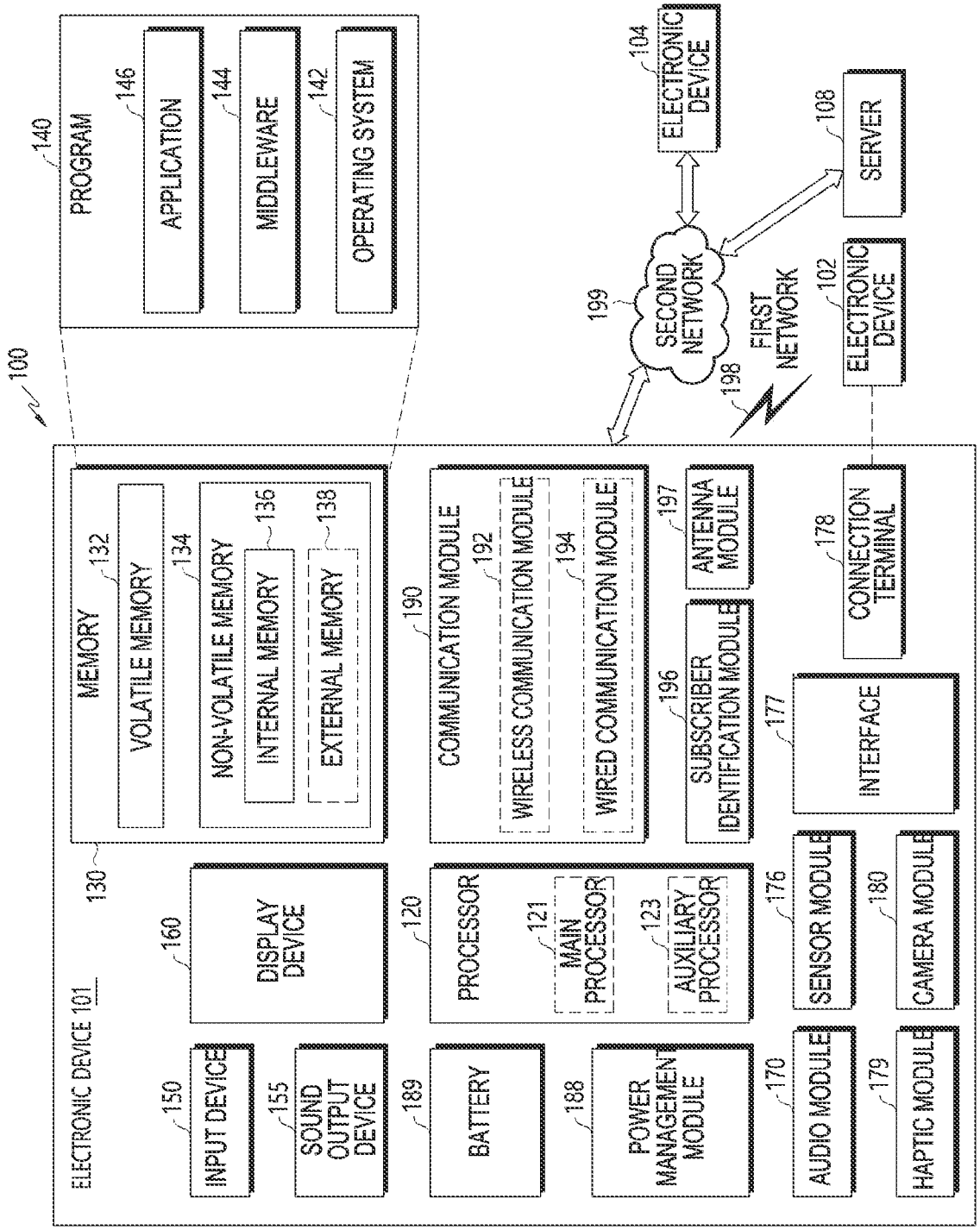
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
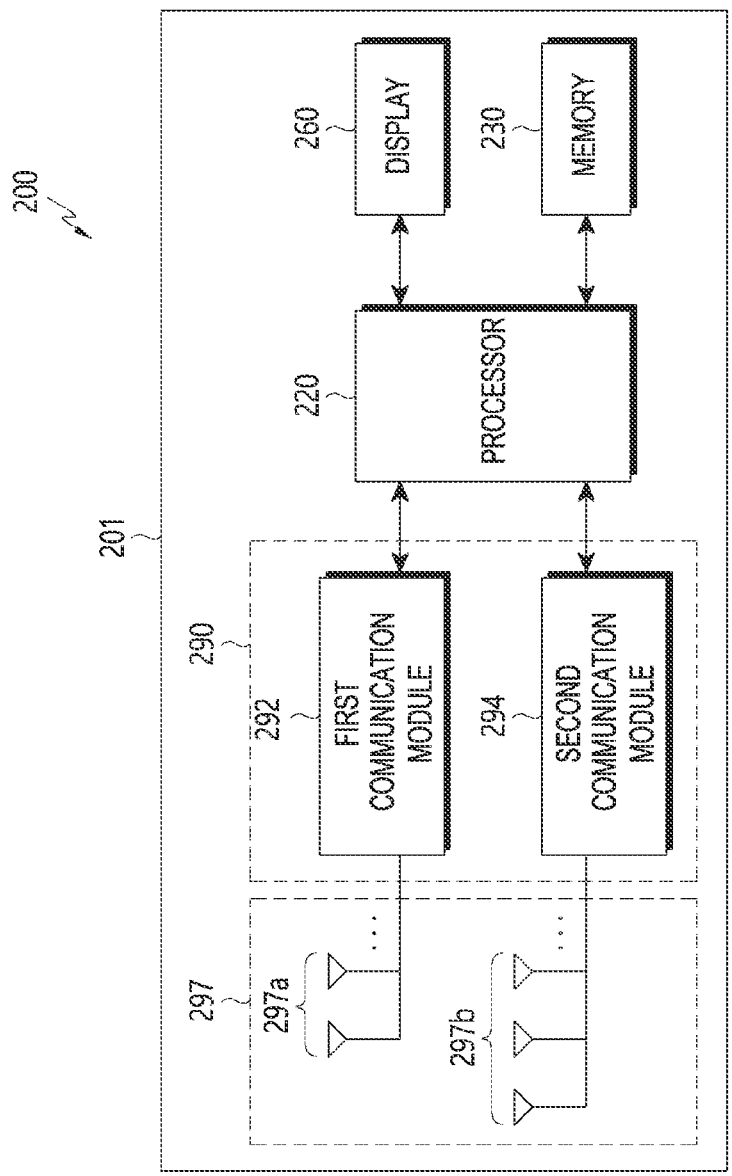
FIG. 2 is a block diagram illustrating an electronic device according to various embodiments.

FIG. 2 is a block diagram 200 illustrating an electronic device 201 according to various embodiments.

In various embodiments, the electronic device 201 may include all or part of the electronic device 101 illustrated in FIG. 1.

Referring to FIG. 2, the electronic device 201 may include a processor 220 (e.g., the processor 120 of FIG. 1), a memory 230 (e.g., the memory 130 of FIG. 1), a display 260 (e.g., the display device 160 of FIG. 1), a communication module 290 (e.g., the communication module 190 of FIG. 1) including a first communication module 292 and a second communication module 294, and an antenna module 297 (e.g., the antenna module 197 of FIG. 1) including a first antenna module 297a and a second antenna module 297b.

The first communication module 292 may communicate with an external electronic device (e.g., the electronic devices 102 and 104 of FIG. 1) through the first antenna module 297a, and may include a network communication module. The first antenna module 297a may include a plurality of antennas, and may include, for example, an antenna of a position source for Wi-Fi communication and an antenna of a position source for cell ID reception.

According to an embodiment, the first communication module 292 may activate a corresponding antenna among the first antenna modules 297a in response to a request from the processor 220, and may transmit location information received from the activated antenna to the processor 220.

The second communication module 294 may communicate with an external electronic device through the second antenna module 297b, and may include a GNSS communication module. The second antenna module 297b may include a plurality of antennas, for example, an antenna of a position source for L1 GNSS, an antenna of a position source for L5/E5 GNSS, an antenna of a position source for real time kinematic (RTK) GNSS, and an antenna of a position source for B1 GNSS.

According to an embodiment, the second communication module 294 may activate a corresponding antenna among the second antenna modules 297b in response to a request from the processor 220, and may transmit location information received from the activated antenna to the processor 220.

The processor 220 may store a location measurement map, which is a reliability map, received from a server (e.g., the server 108 of FIG. 1) in the memory 230.

According to an embodiment, the processor 220 may receive and store a location measurement map corresponding to a cell of the electronic device from the server 108 in response to a request for location information.

According to an embodiment, whenever a cell in which the electronic device 201 is located is changed, the processor 220 may request and receive the location measurement map corresponding to the cell from the server 108. The processor 220 may receive the location measurement map corresponding to the cell where the electronic device 201 is located in a state in which the location information is not requested, and may store the received location measurement map in the memory 230, so that the location measurement map corresponding to the cell may be detected in the memory 230 when the location information is requested thereafter.

According to an embodiment, the processor 220 may pre-receive a location measurement map corresponding to various regions requested by a user from the server 108 and may store the received location measurement map in the memory 230. Whenever the cell in which the electronic device 201 is located is changed, the processor 220 may not request for the location measurement map corresponding to the cell from the server 108, and may retrieve and configure the location measurement map corresponding to the cell from the memory 230.

The processor 220 may identify the location of the electronic device 201 to determine a location measurement method. Here, the location of the electronic device 201 may represent an approximate location of the electronic device 201 for using the location measurement map stored in the memory 230. The processor 220 may identify the current location of the electronic device 201 using an ID of an access point (AP) through a Wi-Fi scan operation. When the ID of the AP is not received or Wi-Fi communication is not possible through the Wi-Fi scan operation, the processor 220 may identify the location of the electronic device 201 by using a cell ID received from a base station at the current location of the electronic device 201. Alternatively, when previously received location information is received within a threshold time and is valid, the processor 220 may identify the location information as the location of the electronic device 201.

When the location of the electronic device 201 is identified, the processor 220 may determine a block corresponding to the location of the electronic device 201 among blocks of the location measurement map stored in the memory 230.

According to an embodiment, the location measurement map may be divided into a plurality of blocks, and may include location information for each of the plurality of blocks, AP list information (e.g., Wi-Fi AP list), and/or priority information (e.g., reliability table) of the position source.

The location information may include location information for the blocks. The blocks may be formed in various shapes (e.g., square or circular), and the blocks having various shapes may include location information. For example, when the block is formed in a square shape, the block may use a true position, which is an absolute coordinate of each vertex, as the location information. For example, when the block is formed in a circular shape, the center of the block may be used as the location information. The server 108 may provide a location measurement map in which the blocks are divided for each region with similar external environment or severe multi-paths, to the electronic device 201.

In the following FIG. 3, location information for the block of the location measurement map will be described.

Figures 3, 4:
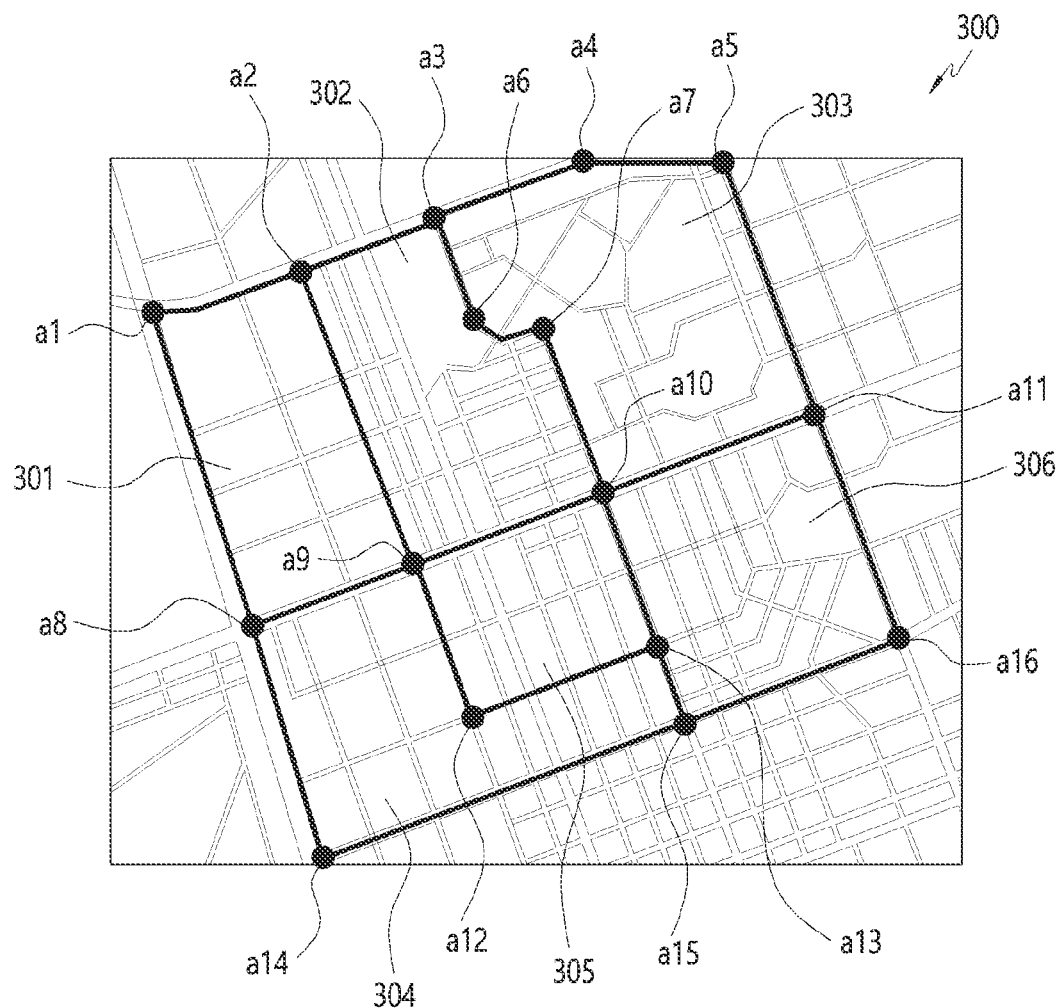
FIG. 3 is a diagram illustrating a block of a location measurement map according to various embodiments.
FIG. 4 is a diagram illustrating priority information of a position source in a block of a location measurement map according to various embodiments.

FIG. 3 is a diagram illustrating a block of a location measurement map 300 according to various embodiments. FIG. 3 illustrates a block of a location measurement map formed in an angular shape as an example.

Referring to FIG. 3, a location measurement map 300 is divided into a plurality of blocks 301, 302, 303, 304, 305, and 306, and the plurality of blocks 301, 302, 303, 304, 305, and 306 may be formed in an angled shape. Each of the plurality of blocks 301, 302, 303, 304, 305, and 306 may include true positions a1, a2, a3, a4, a5, and a16 which are absolute coordinates of each vertex.

According to an embodiment, based on a cell ID received at the electronic device 201 or previously received valid location information stored in the electronic device 201, the processor 220 may determine the block having location information corresponding to the cell ID received at the electronic device 201 or the previously received valid location information stored in the electronic device 201 among the plurality of blocks, as a block where the electronic device 201 is currently located.

The AP list information (e.g., Wi-Fi AP list) may store a Wi-Fi AP list including IDs of APs present in the block.

According to an embodiment, based on the AP list information (e.g., Wi-Fi AP list) for the block and the ID information of the AP obtained through the Wi-Fi scan operation in the electronic device 201, the processor 220 may determine the block having AP list information corresponding to the ID information of the AP obtained through the Wi-Fi scan operation among the plurality of blocks, to be a block in which the electronic device 201 is currently located.

The priority information (e.g., reliability table) of the position source may be provided in the form of a table including the types of position sources that are available in the blocks and reliability scores for the available position sources.

In FIG. 4 below, priority information of a position source for a block of a location measurement map will be described. FIG. 4 is a diagram illustrating priority information of a position source in a block of a location measurement map according to various embodiments.

Referring to FIG. 4, priority information of a position source for a block of a location measurement map may be provided in the form of a table 400. The table 400 may be provided in the form of position sources 402 that can be used in a current block, and may include, for example, L1 GNSS, L5/E5 GNSS, Wi-Fi positioning system, cell ID positioning, and RTK GNSS. In addition, the table 400 may include a reliability score 404 for each of the position sources 402 available in the current block. The reliability score 404 for each of the position sources 402 available in the current block may be stored in the DB of the server 108 by a server (e.g., the server 108 in FIG. 1), and may be continuously updated. The reliability score may be determined using at least one of location error information between location information of the block and actual location information measured using each position source, the degree of GNSS multi-path, the number of Wi-Fi APs, or RTK usability. The less location error information there is between the location information of the block and the actual location information measured using each position source, the higher the reliability score is. For the degree of the GNSS multi-path, the reliability score may decrease along with an increase in a shadow area, and for the number of the Wi-Fi APs, the reliability score may increase along with an increase in the number of the APs. As for the RTK usability, the reliability score may increase when using RTK. Since the RTK is supported starting from radio technical commission for maritime services (RTCM) version 2.1, it can be confirmed that the RTK can be used when an RTCM message is received within a corresponding block. In addition, when the RTCM message is received, the location of a base station may be detected from the RTCM message, and it can be confirmed that the RTK can be used when a distance between the detected location of the base station and the center of the block is within 10 km. When the distance between the location of the base station and the center of the block is within 10 km, it is possible to receive the location information with an error in a unit of cm in a superior electric field. However, when the distance between the location of the base station and the center of the corresponding block is 10 km or more, the usability of the RTK may be degraded, and thus the reliability score may be lowered.

According to an embodiment, the processor 220 may determine a block corresponding to the location of the electronic device 201 among a plurality of blocks of the location measurement map, and may determine a location measurement method for measuring final location information based on the priority information of the position source for the determined block and position source information of the electronic device 201.

Figure 5:
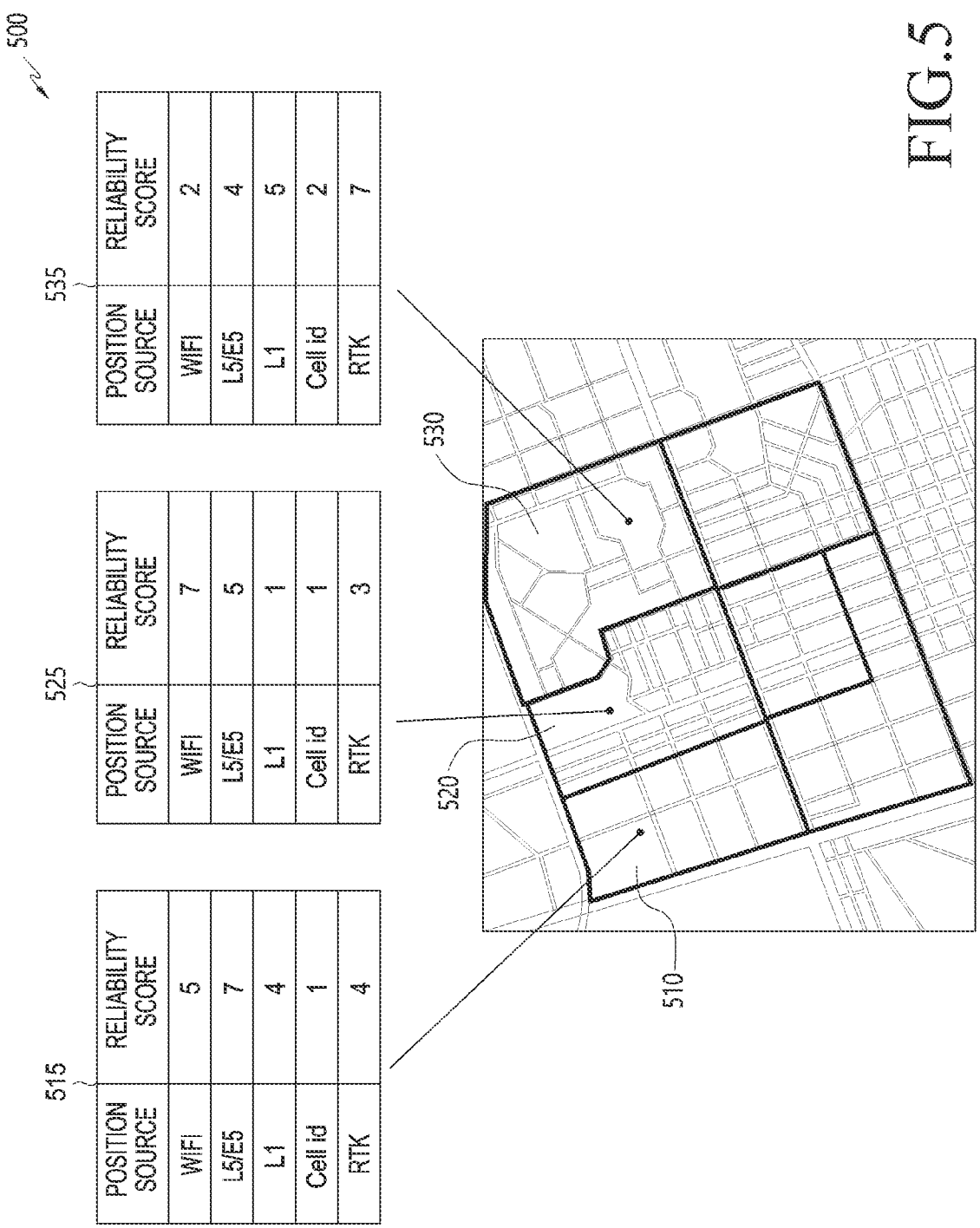
FIG. 5 is a diagram illustrating an operation for determining a location measurement method in an electronic device according to various embodiments.

According to an embodiment, the processor 220 may determine a block corresponding to the location of the electronic device 201 among the plurality of blocks of the location measurement map, may determine an available position source among position sources provided in the electronic device 201 based on the priority information (e.g., the table 400 of FIG. 4) of the position source for the determined block, and may determine one or at least two position sources in descending order starting from the highest reliability score (e.g., 404 of FIG. 4) among the determined position sources. For example, based on the priority information of the position source for the block, when an L1 GNSS position source and an L5 GNSS position source are available in the electronic device 201 and the L5 GNSS position source is identified as the best source with the highest reliability score, the processor 220 may receive location information from the two position sources by activating both an antenna of the L1 GNSS position source (e.g., the antenna module 297 of FIG. 2) and the antenna 297 of the L5 GNSS position source. For example, based on the priority information of the position source for the block, when the L1 GNSS position source, the L5 GNSS position source, and an RTK GNSS position source are available in the electronic device 201 and the RTK GNSS position source is identified as the best source with the highest reliability score, the processor 220 may receive location information from the two position sources by activating both the antenna 297 of the L1 GNSS position source and the antenna 297 of the RTK GNSS position source set as defaults. FIG. 5 below is a diagram illustrating information on a position source that can be used in a block corresponding to a current location of the electronic device 201 among a plurality of blocks of a location measurement map.

FIG. 5 is a diagram 500 illustrating an operation for determining a location measurement method in the electronic device according to various embodiments.

Referring to FIG. 5, when the electronic device 201 is currently located in a first block 510, the processor 220 may identify an L5/E5 GNSS position source having the highest reliability score based on priority information 515 of a position source for the first block 510, and may identify whether there is the antenna 297 of the L5/E5 GNSS position source in the electronic device 201. When there is the antenna 297 of the L5/E5 GNSS position source in the electronic device 201, the processor 220 may receive location information by activating the antenna 297 of the L5/E5 GNSS position source. When there is no antenna 297 of the L5/E5 GNSS position source in the electronic device 201, the processor 220 may identify whether there is the antenna 297 of the Wi-Fi position source having the second highest reliability score. When there is the antenna 297 of the Wi-Fi position source, the processor 220 may receive location information by activating the antenna 297 of the Wi-Fi position source.

When the electronic device 201 is currently located in a second block 510, the processor 220 may identify a Wi-Fi position source with the highest reliability score based on priority information 525 of the position source for the second block 520, and may identify whether there is the antenna 297 of the Wi-Fi position source in the electronic device 201. When there is the antenna 297 of the Wi-Fi position source in the electronic device 201, the processor 220 may receive location information by activating the antenna 297 of the Wi-Fi position source.

When the electronic device 201 is currently located in a third block 530, the processor 220 may identify an RTK position source having the highest reliability score based on priority information 535 of the position source for the third block 530, and may identify whether there is the antenna 297 of the RTK position source in the electronic device 201. When there is the antenna 297 of the RTK position source in the electronic device 201, the processor 220 may receive location information by activating the antenna 297 of the L1 GNSS position source and the antenna 297 of the RTK position source configured as defaults.

When a block corresponding to the location of the electronic device 201 among the plurality of blocks of the location measurement map is determined in a state in which the electronic device 201 is connected to an external device, the processor 220 may determine a location measurement method for measuring final location information based on priority information of the position source for the block, position source information of the electronic device 201, and position source information of the external device.

According to an embodiment, the processor 220 may determine a block corresponding to the location of the electronic device 201 among the plurality of blocks of the location measurement map in a state in which the electronic device 201 communicates with an external device (e.g., a vehicle) wiredly or wirelessly. The processor 220 may determine an available position source from both a position source provided in the electronic device 201 and a position source provided in the external device (e.g., a vehicle) based on the priority information (e.g., the table 400 of FIG. 4) of the position source for the block. The processor 220 may determine one or at least two position sources in descending order starting from the highest reliability score among the determined position sources. When the position source of the external device is included in the determined one or at least two position sources, the processor 220 may receive location information measured through the antenna of the position source of the external device from the external device to which communication is connected.

According to an embodiment, the processor 220 may display that the location information of the electronic device 201 is measured using the position source of the external device through the display 260, through a user interface (UI) or a graphical user interface (GUI).

The processor 220 may determine at least two location measurement methods for measuring final location information of the electronic device 201, and may measure the final location information of the electronic device 201 using the determined at least two location measurement methods.

According to an embodiment, the processor 220 may activate the antenna 297 of each of at least two position sources corresponding to the determined at least two location measurement methods. When receiving both two pieces of location information through the antenna 297 of each of the at least two position sources, the processor 220 may determine location information of the position source having the highest reliability score among the at least two position sources to be final location information. When receiving location information through any one of the antennas 297 of the at least two position sources, the processor 220 may determine location information received from the one antenna 297 to be final location information.

According to an embodiment, when the movement path of the electronic device 201 is determined, the processor 220 may predict in advance a block in which the electronic device 201 is to enter among the plurality of blocks of the location measurement map, and may determine in advance a location measurement method to be used in the block in which the electronic device 201 is to enter.

According to an embodiment, when a destination is input and directions are started while a navigation application is executed, the processor 220 may determine a movement path from the current location of the electronic device 201 to the destination, and may determine a location measurement map including a plurality of blocks corresponding to the movement path of the electronic device 201. The processor 220 may determine in advance a method for measuring the location of the next block based on priority information of the position source for the next block predicted from the current block in which the electronic device 201 is located. When the electronic device 201 is located in the next block, the processor 220 may determine the final location of the electronic device 201 by the predetermined location measurement method without a delay time for determining the location measurement method for the next block. FIGS. 6A, 6B, 6C, and 6D below are diagrams illustrating an operation of using a location measurement map when a navigation application is executed in the electronic device 201.

FIGS. 6A, 6B, 6C, and 6D are diagrams 600a, 600b, 600c, and 600d illustrating a route guidance operation through a navigation application using a location measurement map in an electronic device according to various embodiments.

Figure 6A:
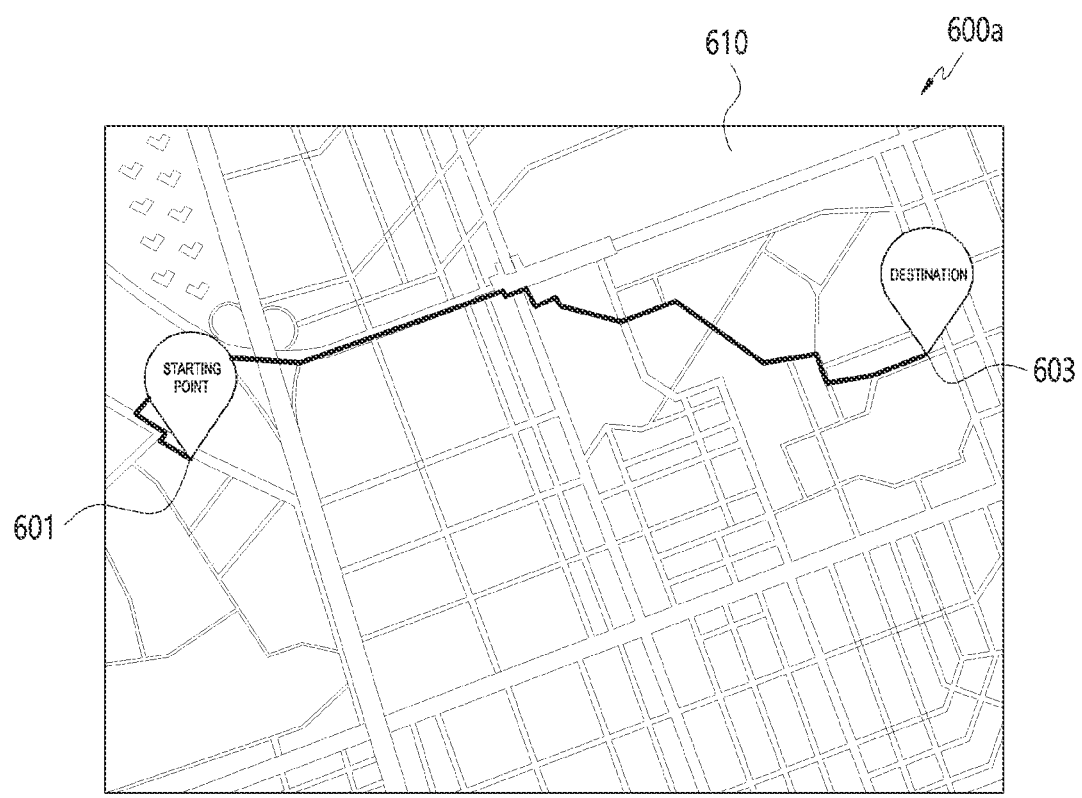
FIGS. 6A, 6B, 6C, and 6D are diagrams illustrating a route guidance operation through a navigation application using a location measurement map in an electronic device according to various embodiments.

As illustrated in FIG. 6A, the processor 220 may display a movement path from a starting point 601, which is input by a user or is the current location of the electronic device 201, to a destination 603 input by the user on the display 260 while a navigation application 610 is executed.

Figure 6B:
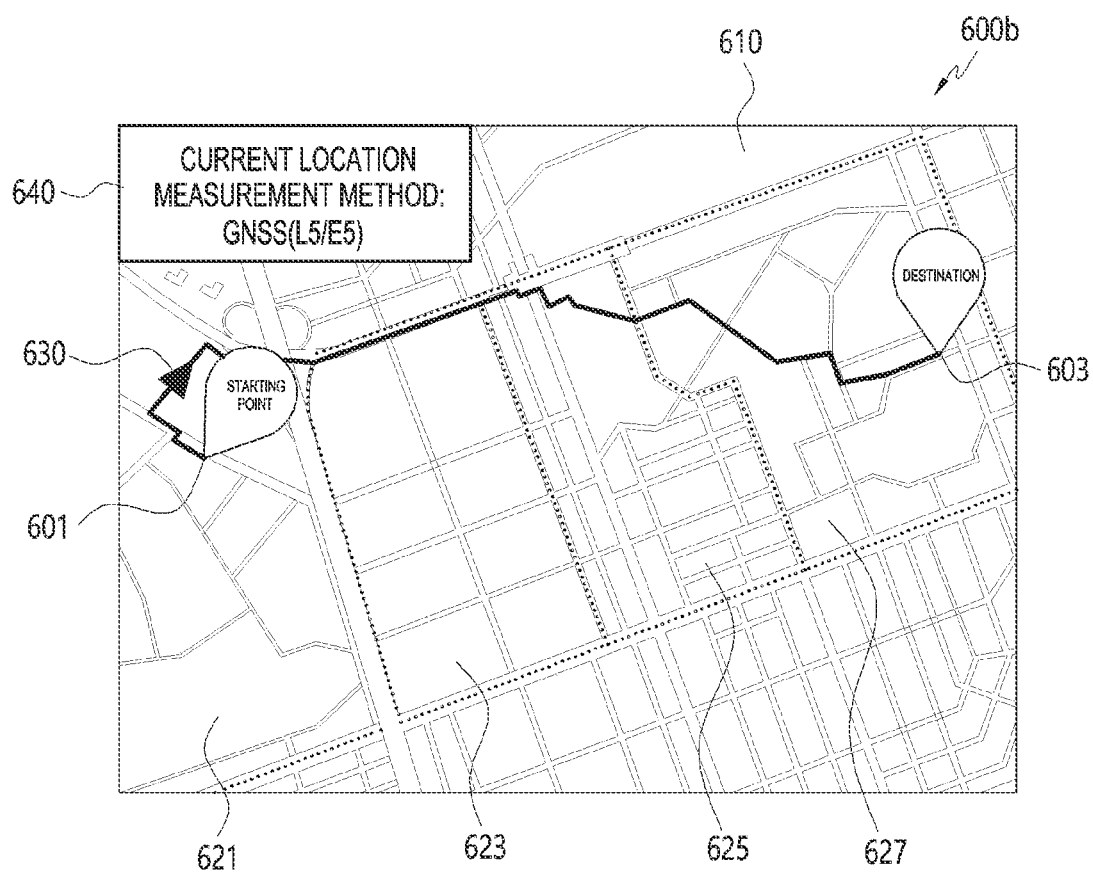

As illustrated in FIG. 6B, the selection of the route guidance start is received, the processor 220 may identify at least one block 621, 623, 625, and 627 corresponding to the movement path from the starting point 601 to the destination 603 in the location measurement map.

The processor 220 may determine a location measurement method based on priority information of a position source for a first block 621 in which the electronic device 201 is currently located 630 and position source information of the electronic device 201. The processor 220 may activate an antenna (e.g., the antenna module 297 of FIG. 2) of the position source corresponding to the location measurement method determined by the electronic device 201, and may obtain location information received through the activated antenna 297 of the position source. As illustrated in FIG. 6B, the processor 220 may display the type of the position source being used to measure the location information of the electronic device 201 in the current location 630 as a UI or a GUI on at least partial area 640 of the display 260 while displaying the movement path and the current location 630 of the electronic device 201 through the display 260. For example, as illustrated in FIG. 6B, "location measurement method for current location: GNSS (L5/E5)" may be displayed in the partial area 640 of the display 260. The processor 220 may determine in advance a location measurement method for the second block 623 based on priority information of a position source for the second block 623 predicted as the next movement location of the electronic device 201 while the electronic device 201 is located in the first block 621.

Figure 6C:
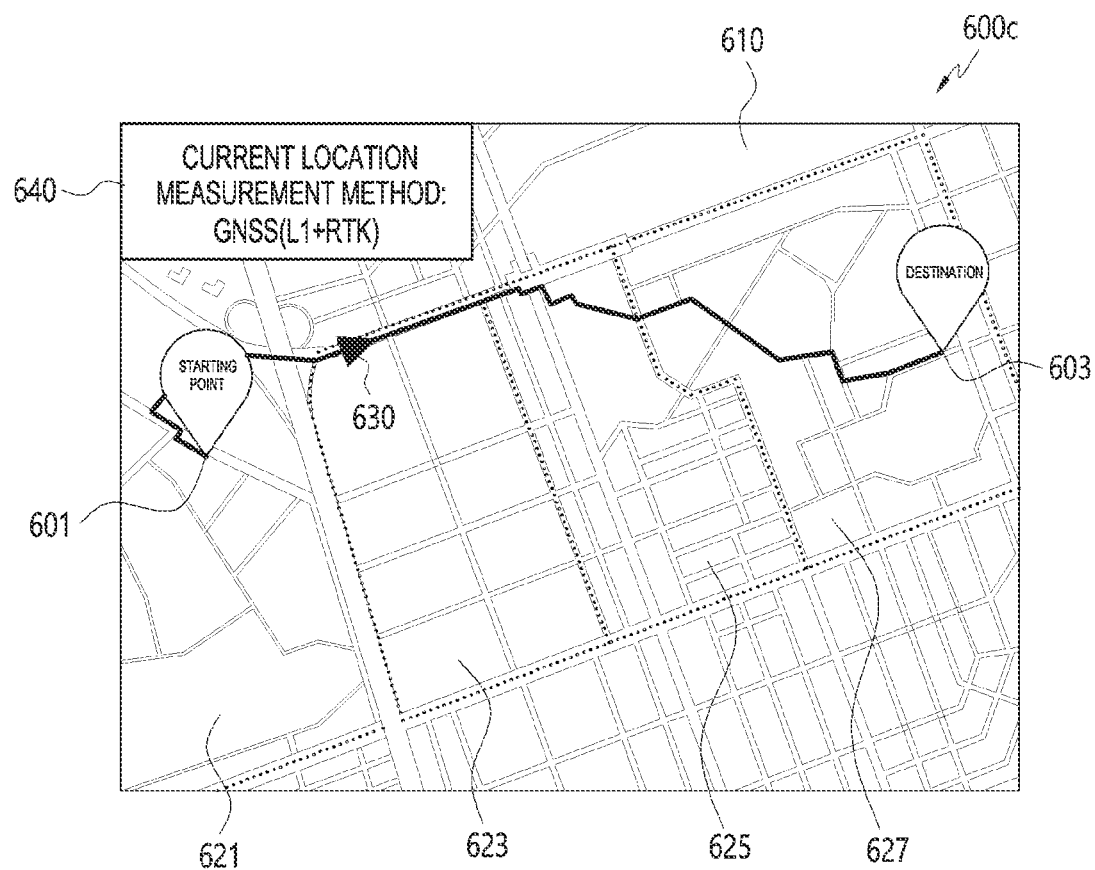

As illustrated in FIG. 6C, when the electronic device 201 detects the entry into the second block 623 (e.g., the current location 630), the processor 220 may activate the antenna 297 of the position source corresponding to the location measurement method for the second block 623 determined in advance in the first block 621 by the electronic device 201, and may obtain location information received through the activated antenna 297 of the position source. As illustrated in FIG. 6C, the processor 220 may display the type of the position source being used to measure the location information of the electronic device 201 in the current location 630 as a UI or a GUI on the at least partial area 640 of the display 260 while the movement path and current location 630 of the electronic device 201 is displayed through the display 260. For example, "location measurement method for current location: GNSS (L1+RTK)" may be displayed on the partial area 640 of the display 260 as illustrated in FIG. 6C. The processor 220 may determine in advance a location measurement method for the third block 625 based on priority information of a position source for the third block 625 predicted as the next movement location of the electronic device 201 while the electronic device 201 is located in the second block 623.

Figure 6D:
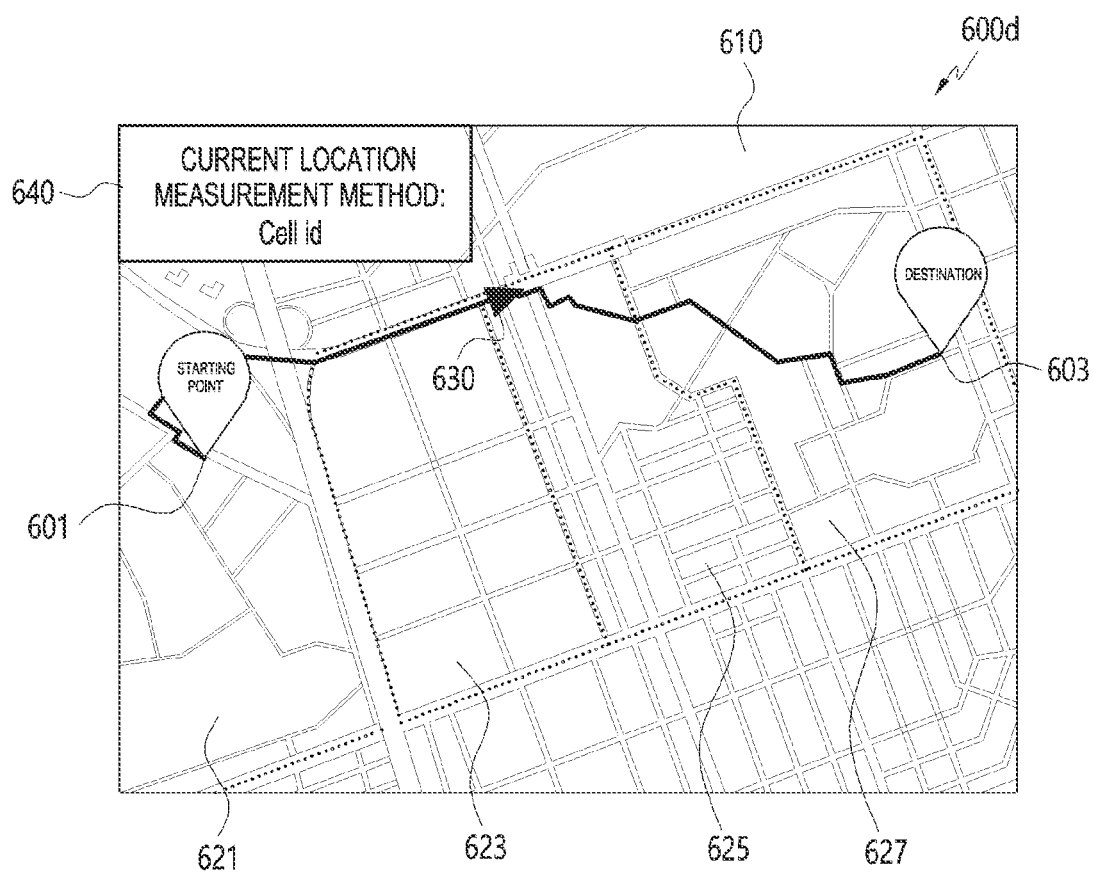

As illustrated in FIG. 6D, when the electronic device 201 detects the entry into the third block 625 (e.g., the current location 630), the processor 220 may activate the antenna 297 of the position source corresponding to the location measurement method for the third block 625 determined in advance in the second block 623 by the electronic device 201, and may obtain location information received through the activated antenna 297 of the position source. As illustrated in FIG. 6D, the processor 220 may display the type of the position source being used to measure the location information of the electronic device 201 in the current location 630 as a UI or a GUI on the at least partial area 640 of the display 260 while the movement path and current location 630 of the electronic device 201 is displayed through the display 260. For example, "location measurement method for current location: cell ID" may be displayed on the partial area 640 of the display 260 as illustrated in FIG. 6D. The processor 220 may determine in advance a location measurement method for the fourth block 627 based on priority information of a position source for the fourth block 627 predicted as the next movement location of the electronic device 201 while the electronic device 201 is located in the third block 625.

Figure 7A:
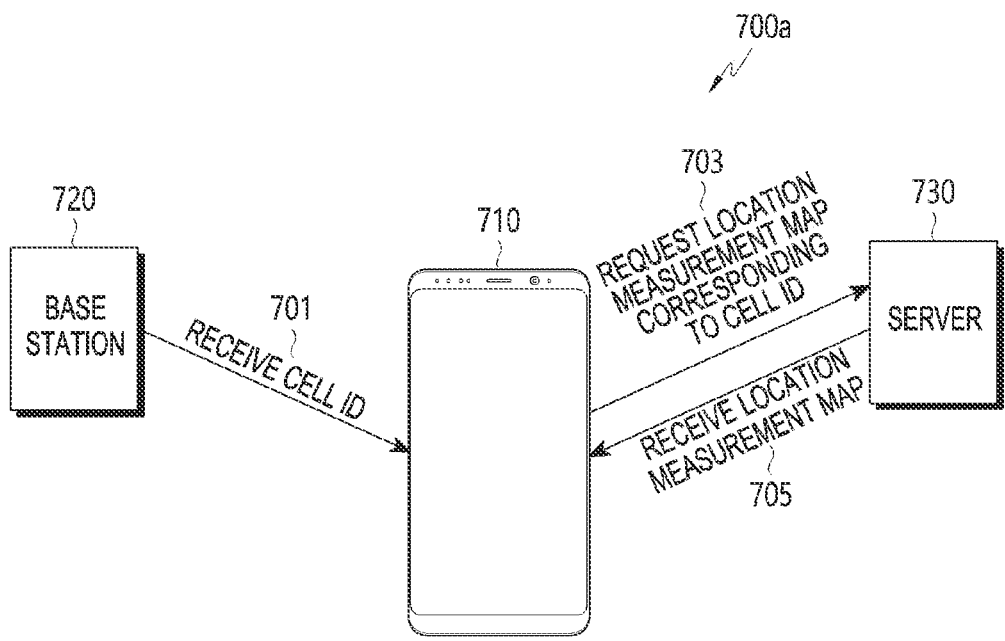
FIGS. 7A and 7B are diagrams illustrating reception of a location measurement map in an electronic device according to various embodiments.
Figure 7B:
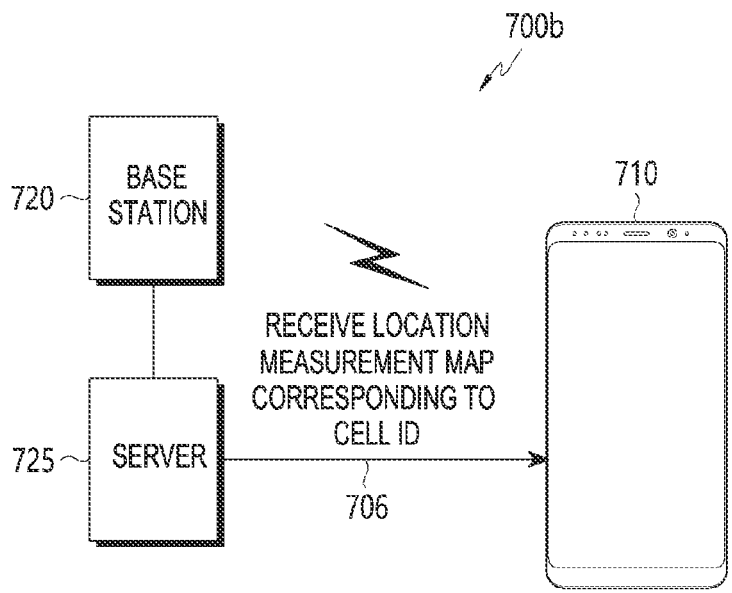

FIGS. 7A and 7B are diagrams 700a and 700b illustrating reception of a location measurement map in an electronic device according to various embodiments.

As illustrated in FIG. 7A, in operation 701, an electronic device 710 (e.g., the electronic device 201 of FIG. 2) may receive a cell ID from a base station 720 of a cell in which the electronic device 710 is currently located.

In operation 703, when the cell ID is received from the base station 720, the electronic device 710 may request a location measurement map corresponding to the cell ID from a server 730 providing a location measurement map, which is a reliability map.

In operation 705, the electronic device 710 may receive and store the location measurement map corresponding to the cell ID from the server 730 in response to the request from the electronic device 710.

Alternatively, as illustrated in FIG. 7B, when the electronic device 710 (e.g., the electronic device 201 of FIG. 2) is connected to the base station 720 of the cell in which the electronic device 710 is currently located, in operation 706, the electronic device 710 may receive and store the location measurement map corresponding to the cell in which the electronic device 710 is currently located from a server 725 (e.g., an edge server or a mobile edge computing (MEC)

server) disposed in the base station 720 or in a core network connected to the base station 720. Since the server 725 stores the location measurement map corresponding to the cell, the electronic device 710 may receive and store the location measurement map, which is a reliability map, corresponding to the cell in which the electronic device 710 is currently located without requesting provision of the cell ID from a separate server. When handover between base stations occurs due to the movement of the electronic device 201, the electronic device 201 may receive and store the location measurement map, which is the reliability map, corresponding to the cell in which the electronic device is currently located from the server (e.g., an edge server or an MEC server) in the base station of the changed cell location or in the core network connected to the base station.

According to various embodiments, an electronic device may include: a housing; a touchscreen display (e.g., the display 260 of FIG. 2) configured to be visible through a portion of the housing; at least one communication module configured to be located in the housing; a processor (e.g., the processor 220 of FIG. 2) configured to be located in the housing and to be operatively connected to the display 260 and the at least one communication module; and a memory (e.g., the memory 230 of FIG. 2) configured to be located in the housing and to be operatively connected to the processor, wherein the memory is configured to store a location measurement map and stores, when executed, instructions that cause the processor to: identify a location of the electronic device using the communication module; determine a block corresponding to the location of the electronic device in the location measurement map at least partially based on the identified location of the electronic device; determine a location measurement method at least partially based on priority information of a position source for the determined block and position source information of the electronic device; and measure a final location of the electronic device by the determined location measurement method using the communication module.

According to various embodiments, the location measurement map may be divided into a plurality of blocks, and may be configured to include location information, AP list information, and/or priority information of the position source for the block.

According to various embodiments, the instructions may be configured to cause the processor 220 to: identify the location of the electronic device at least partially based on a Wi-Fi scan operation or a cell ID received from a base station, using the communication module.

According to various embodiments, the instructions may be configured to cause the processor 220 to: determine the block corresponding to the location of the electronic device at least partially based on the location information or AP list information for the block of the location measurement map.

According to various embodiments, the instructions may be configured to cause the processor 220 to: determine at least one position source among position sources of the electronic device at least partially based on the priority information of the position source, and determine the location measurement method using the determined at least one position source.

According to various embodiments, the instructions may be configured to cause the processor 220 to: determine a final location of the electronic device from at least one piece of location information received by the location measurement method at least partially based on the priority information of the position source included in the block.

According to various embodiments, the instructions may be configured to cause the processor 220 to: determine, when the electronic device is connected to an external device, the location measurement method at least partially based on the priority information of the position source included in the block, the position source information of the electronic device, and/or a position source of the external device.

According to various embodiments, the instructions may be configured to cause the processor 220 to: identify, when a movement path of the electronic device is determined, at least one block corresponding to the movement path in the location measurement map; determine in advance a location measurement method at least partially based on priority information of a position source for a next block in a current block in which the electronic device is located; and measure a final location of the electronic device in the location measurement method determined in advance when the electronic device is located in the next block.

According to various embodiments, the instructions may be configured to cause the processor 220 to: receive, when a service cell is changed, a location measurement map corresponding to the changed service cell.

According to various embodiments, the instructions may be configured to cause the processor 220 to: display the location measurement method of measuring the final location of the electronic device as a UI or a GUI through the display.

Figure 8:
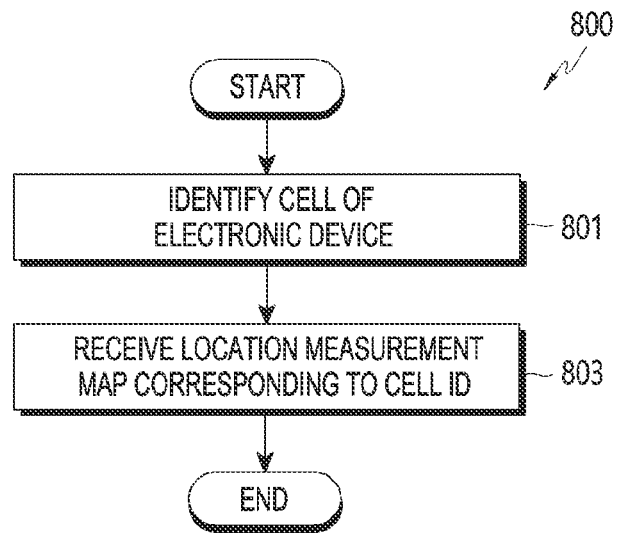
FIG. 8 is a flowchart illustrating an operation of receiving a location measurement map in an electronic device according to various embodiments.

FIG. 8 is a flowchart 800 illustrating an operation of receiving a location measurement map in an electronic device according to various embodiments.

In operation 801, a processor (e.g., the processor 220 of FIG. 2) may identify a service cell of an electronic device.

According to an embodiment, the processor 220 may receive an ID of the service cell in which the electronic device is currently located from a server (e.g., the server 730 of FIG. 7A or the server 725 of FIG. 7B) of the identified service cell in response to a request for location information.

According to an embodiment, the processor 220 may receive a service cell ID of a currently changed location of the electronic device from the server (e.g., the server 730 of FIG. 7A or the server 725 of FIG. 7B) of the service cell of the changed location in response to the location change of the electronic device.

In operation 803, the processor 220 may receive a location measurement map corresponding to the service cell ID in which the electronic device is currently located from the server (e.g., the server 730 of FIG. 7A or the server 725 of FIG. 7B), and may store the received location measurement map in a memory (e.g., the memory 230 of FIG. 2).

According to an embodiment, the processor 220 may receive in advance a location measurement map corresponding to various regions requested by a user from the server (e.g., the server 730 of FIG. 7A or the server 725 of FIG. 7B) and may store the received location measurement map in the memory 230.

Figure 9:
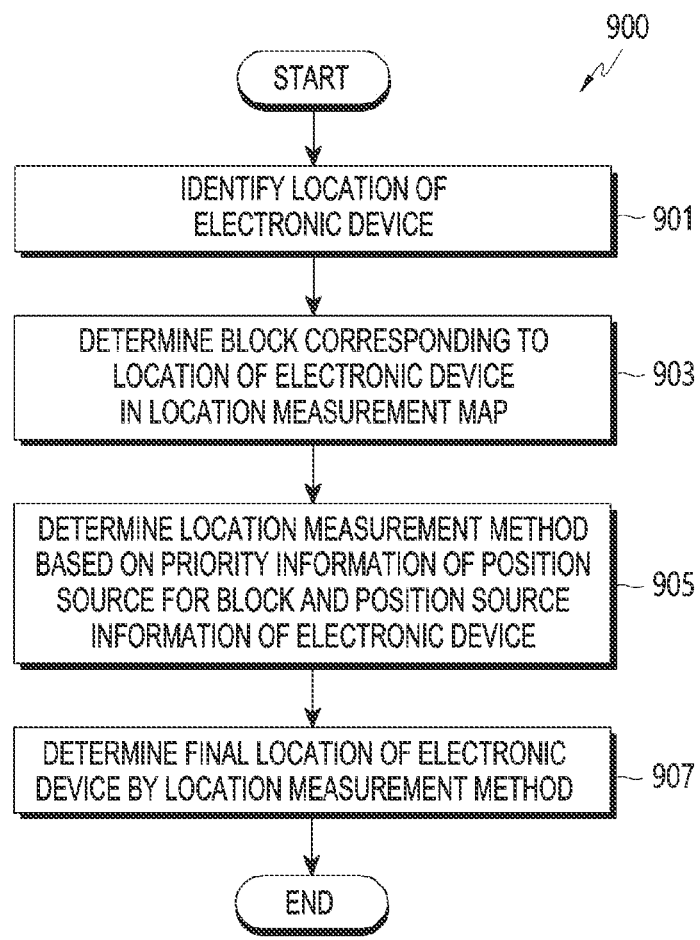
FIG. 9 is a flowchart illustrating a location measurement operation in an electronic device according to various embodiments.

FIG. 9 is a flowchart 900 illustrating a location measurement operation in an electronic device according to various embodiments.

Referring to FIG. 9, in operation 901, a processor (e.g., the processor 220 of FIG. 2) may identify a location of an electronic device (e.g., the electronic device 201 of FIG. 2 or the electronic device 710 of FIG. 7) when location information is requested from a specific application (e.g., a map application).

According to an embodiment, to identify the approximate location of the electronic device 201, the processor 220 may identify the current location of the electronic device 201 using an ID of an AP through a Wi-Fi scan operation, may identify the location of the electronic device 201 using a cell ID received from a base station (e.g., the base station 720 of FIG. 7A) of a service cell in the current location of the electronic device 201, or may identify, when previously received location information is received within a threshold time and is valid, the location information as the location of the electronic device 201.

In operation 903, the processor 220 may determine a block corresponding to the location of the electronic device 201 in a location measurement map.

According to an embodiment, based on location information for each of a plurality of blocks of the location measurement map, the processor 220 may determine a block including the cell ID used to identify the location of the electronic device 201 and the previously received valid location information among the plurality of blocks, to be the block corresponding to the location of the electronic device 201.

According to an embodiment, based on AP list information (e.g., Wi-Fi AP list) for each of the plurality of blocks of the location measurement map, the processor 220 may determine a block including the ID of the AP received through the Wi-Fi scan operation used to identify the location of the electronic device 201 among the plurality of blocks, to be the block corresponding to the location of the electronic device 201.

In operation 905, the processor 220 may determine a location measurement method based on priority information of a position source for the block corresponding to the location of the electronic device 201 and position source information of the electronic device 201.

According to an embodiment, when the block corresponding to the location of the electronic device 201 is determined from among the plurality of blocks of the location measurement map, the processor 220 may identify whether one or at least two position sources are included in the electronic device 201 in descending order starting from the highest reliability score in the priority information (e.g., the table 400 of FIG. 4) of the position source for the determined block. When the one or at least two position sources in descending order starting from the highest reliability score are included in the electronic device 201, the processor 220 may determine the location measurement method using the one or at least two position sources to be a final location measurement method of the electronic device 201. The processor 220 may activate an antenna (e.g., the antenna module 297 of FIG. 2) of the one or at least two position sources using a communication module (e.g., the communication module 290 of FIG. 2), and may request location information received from the activated antenna 297.

In operation 907, the processor 220 may determine the location information measured by the final location measurement method to be final location information of the electronic device 201.

According to an embodiment, when one location measurement method with the highest reliability score is determined based on the priority information (e.g., the table 400 of FIG. 4) of the position source for the block corresponding to the location of the electronic device 201, the processor 220 may transmit the location information measured through the location measurement method to a specific application, as the final location information of the electronic device 201.

According to an embodiment, in a case in which at least two location measurement methods are determined in descending order starting from the highest reliability score based on the priority information (e.g., the table 400 of FIG. 4) of the position source for the block corresponding to the location of the electronic device 201, when two pieces of location information are received by the at least two location measurement methods, the processor 220 may transmit location information received by the location measurement method having a higher reliability score from the two location measurement methods to the specific application, as the final location information of the electronic device 201. When the location information is received by only one location measurement method of the at least two location measurement methods, the processor 220 may transmit the received location information to the specific application as the final location information of the electronic device 201.

Figure 10:
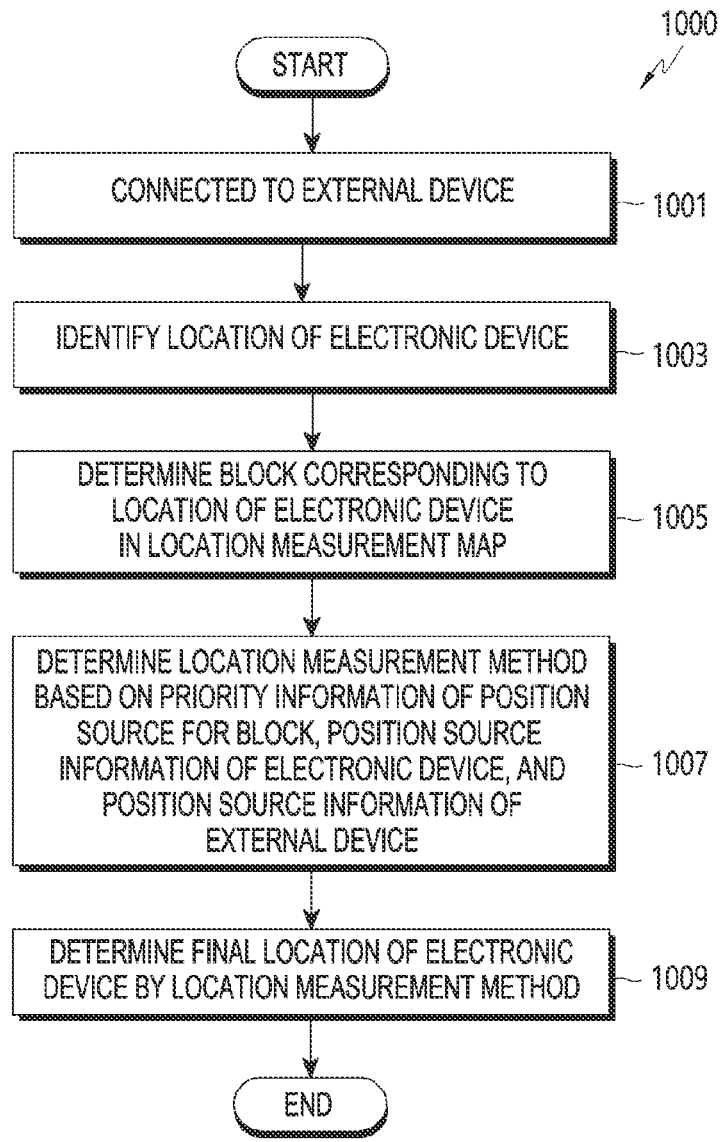
FIG. 10 is a flowchart illustrating a location measurement operation in an electronic device according to various embodiments.

FIG. 10 is a flowchart 1000 illustrating a location measurement operation in an electronic device according to various embodiments.

Referring to FIG. 10, in operation 1001, a processor (e.g., the processor 220 of FIG. 2) may identify that an electronic device (e.g., the electronic device 201 of FIG. 2) is connected to an external device (e.g., a vehicle) wiredly or wirelessly.

In operation 1003, when location information is requested from a specific application (e.g., a map application), the processor 220 may identify the location of the electronic device 201.

According to an embodiment, to identify the approximate location of the electronic device 201, the processor 220 may identify the current location of the electronic device 201 using an ID of an AP retrieved through a Wi-Fi scan operation, may identify the location of the electronic device 201 using a cell ID received from a base station (e.g., the base station 720 of FIG. 7A) of a service cell in the current location of the electronic device 201, or may identify, when previously received location information is received within a threshold time and is valid, the location information as the location of the electronic device 201.

In operation 1005, the processor 220 may determine a block corresponding to the location of the electronic device 201 in a location measurement map.

According to an embodiment, based on location information for each of a plurality of blocks of the location measurement map, the processor 220 may determine a block including the cell ID used to identify the location of the electronic device 201 and the previously received valid location information among the plurality of blocks, to be the block corresponding to the location of the electronic device 201.

According to an embodiment, based on AP list information (e.g., a Wi-Fi AP list) for each of the plurality of blocks of the location measurement map, the processor 220 may determine a block including the ID of the AP received through the Wi-Fi scan operation used to identify the location of the electronic device 201 among the plurality of blocks, to be the block corresponding to the location of the electronic device 201.

In operation 1007, the processor 220 may determine a location measurement method based on priority information of a position source for the block corresponding to the location of the electronic device 201, position source information of the electronic device 201, and position source information of an external device.

According to an embodiment, the processor 220 may determine the block corresponding to the location of the electronic device 201 among the plurality of blocks of the location measurement map, and may identify whether one or at least two position sources in descending order starting from the highest reliability score are included in the electronic device 201 and the external device in the priority information (e.g., the table 400 of FIG. 4) of the position source for the determined block. When the one or at least two position sources in descending order starting from the highest reliability score are included in at least one of the electronic device 201 or the external device, the processor 220 may determine a location measurement method using the one or at least two position sources to be a final location measurement method of the electronic device 201. When the one or at least two position sources in descending order starting from the highest reliability score are included in the electronic device 201, the processor 220 may activate an antenna (e.g., the antenna module 297 of FIG. 2) of the one or at least two position sources using a communication module (e.g., the communication module 290 of FIG. 2), and may request location information received from the activated antenna 297. When the one or at least two position sources in descending order starting from the highest reliability score are included in the external device, the processor 220 may request reception of location information received at an antenna of the external device from the external device.

In operation 1009, the processor 220 may determine the location information measured by the location measurement method to be final location information of the electronic device 201.

According to an embodiment, when one location measurement method having the highest reliability score is determined based on priority information (e.g., the table 400 of FIG. 4) of a position source for the block corresponding to the location of the electronic device 201, the processor 220 may transmit the location information measured through the location measurement method to the specific application, as the final location information of the electronic device 201.

According to an embodiment, in a condition in which at least two location measurement methods in descending order starting from the highest reliability score are determined based on the priority information (e.g., the table 400 of FIG. 4) of the position source for the block corresponding to the location of the electronic device 201, when two pieces of location information is received by the at least two location measurement methods, the processor 220 may transmit the location information received by the location measurement method having a higher reliability score from the two pieces of location information to the specific application as the final location information of the electronic device 201. When the one piece of location information received by the one location measurement method of the at least two location measurement methods is received, the processor 220 may transmit the received location information to the specific application, as the final location information of the electronic device 201.

Figure 11:
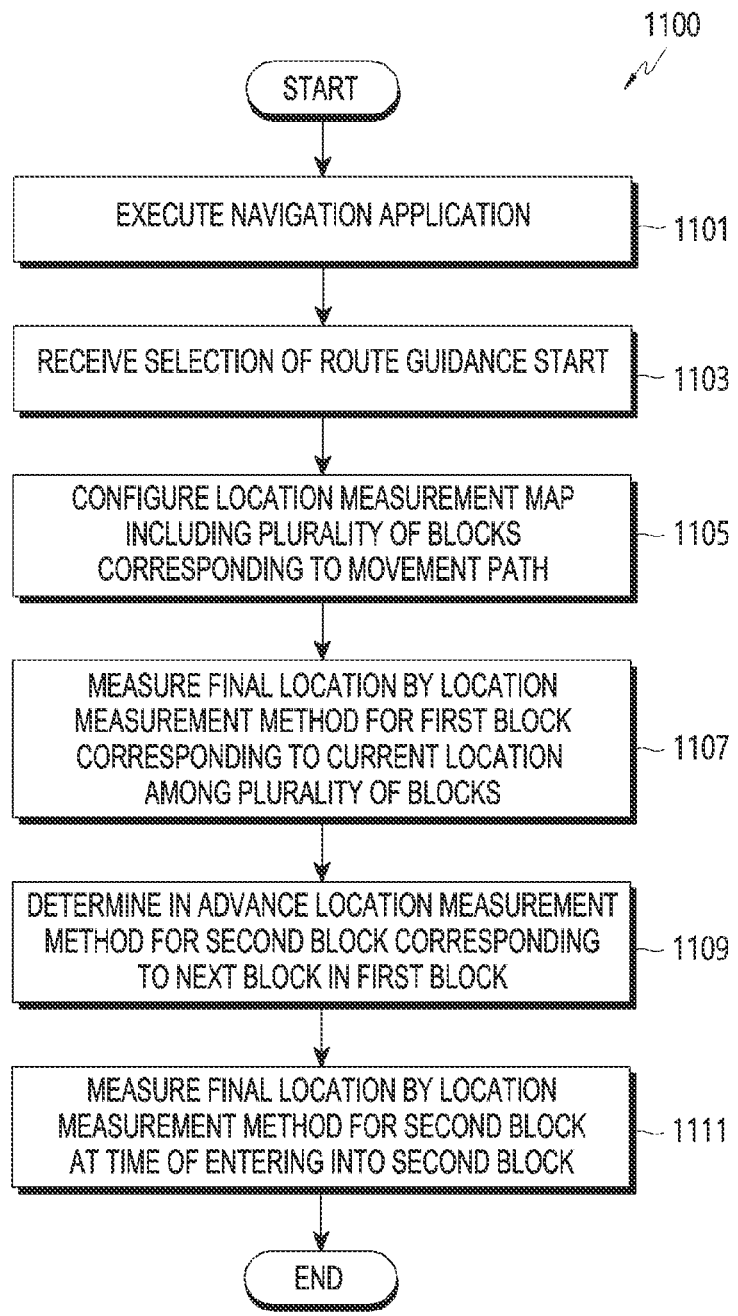
FIG. 11 is a flowchart illustrating a location measurement operation in an electronic device according to various embodiments.

FIG. 11 is a flowchart 1100 illustrating a location measurement operation in an electronic device according to various embodiments.

In operation 1101, a processor (e.g., the processor 220 of FIG. 2) may execute a navigation application in response to a request from a user.

In operation 1103, the processor 220 may receive a selection of a route guidance start from a current location of the electronic device 201 or a starting point input by a user to a destination input by the user.

In operation 1105, the processor 220 may determine a movement path from the starting point to the destination, and may determine a location measurement map including a plurality of blocks corresponding to the movement path from a memory (e.g., the memory 230 of FIG. 2).

In operation 1107, the processor 220 may determine a location measurement method for a first block based on priority information of a position source for the first block corresponding to the current location of the electronic device 201 among a plurality of blocks of the location measurement map. The processor 220 may measure final location information of the electronic device 201 in the location measurement method for the first block, and may transmit the measured final location information of the electronic device 201 to a navigation application.

In operation 1109, the processor 220 may predict a second block as a next block of the electronic device 201 in the first block corresponding to the current location of the electronic device 201, and may determine in advance a location measurement method for the second block based on priority information of the position source for the second block.

In operation 1111, when the electronic device 201 detects the entry into the second block among the plurality of blocks of the location measurement map, the processor 220 may measure the final location information of the electronic device 201 by the location measurement method for the second block determined in advance, and may transmit the measured final location information of the electronic device 201 to the navigation application.

According to various embodiments, a method of measuring a location of an electronic device may include: identifying the location of the electronic device; determining a block corresponding to the location of the electronic device in a location measurement map at least partially based on the location of the electronic device; determining a location measurement method at least partially based on priority information of a position source for the determined block and position source information of the electronic device; and measuring a final location of the electronic device using the determined location measurement method.

According to various embodiments, the location measurement map may be divided into a plurality of blocks, and may be configured to include location information, AP list information, and/or priority information of the position source for the block.

According to various embodiments, the identifying of the location of the electronic device may include identifying the location of the electronic device at least partially based on a Wi-Fi scan operation or a cell ID received from a base station.

According to various embodiments, the determining of the block may include determining the block corresponding to the location of the electronic device at least partially based on the location information or AP list information for the block of the location measurement map.

According to various embodiments, the determining of the location measurement method may include: determining at least one position source among position sources of the electronic device at least partially based on the priority information of the position source, and determining the location measurement method using the determined at least one position source.

According to various embodiments, the measuring of the final location of the electronic device may include determining a final location of the electronic device from at least one piece of location information received by the location measurement method at least partially based on the priority information of the position source included in the block.

According to various embodiments, the method may further include determining, when the electronic device is connected to an external device, the location measurement method at least partially based on the priority information of the position source included in the block, the position source information of the electronic device, and/or a position source of the external device.

According to various embodiments, the method may further include: identifying, when a movement path of the electronic device is determined, at least one block corresponding to the movement path in the location measurement map; determining in advance a location measurement method at least partially based on priority information of a position source for a next block in a current block in which the electronic device is located; and measuring a final location of the electronic device in the location measurement method determined in advance when the electronic device is located in the next block.

According to various embodiments, the method may further include receiving, when a service cell is changed, a location measurement map corresponding to the changed service cell.

According to various embodiments, the method may further include displaying the location measurement method of measuring the final location of the electronic device as a UI or a GUI through the display.

The invention claimed is:

1. An electronic device comprising:
a housing;
a touchscreen display configured to be visible through a portion of the housing;
at least one communication module configured to be located in the housing;
a processor configured to be located in the housing and to be operatively connected to the display and the at least one communication module; and
a memory configured to be located in the housing and to be operatively connected to the processor,
wherein the memory is configured to store a location measurement map and stores instructions that, when executed, cause the processor to:
identify a location of the electronic device using the communication module;
determine a block corresponding to the location of the electronic device in the location measurement map at least partially based on the identified location of the electronic device;
determine a location measurement method at least partially based on priority information of a position source for the determined block and position source information of the electronic device;
measure a final location of the electronic device by the determined location measurement method using the communication module;
display the location measurement method of measuring the final location of the electronic device as a user interface (UI) through the display;
identify, when a movement path of the electronic device is determined, at least one block corresponding to the movement path in the location measurement map;
determine in advance a location measurement method at least partially based on priority information of a position source for a next block in a current block in which the electronic device is located;
measure a final location of the electronic device in the location measurement method determined in advance when the electronic device is located in the next block; and receive, when a service cell is changed, a location measurement map corresponding to the changed service cell.

2. The electronic device of claim 1, wherein the location measurement map is divided into a plurality of blocks, and is configured to comprise location information, access point (AP) list information, and/or priority information of the position source for the block.

3. The electronic device of claim 1, wherein the instructions are configured to cause the processor to identify the location of the electronic device at least partially based on a Wi-Fi scan operation or a cell ID received from a base station, using the communication module.

4. The electronic device of claim 1, wherein the instructions are configured to cause the processor to determine the block corresponding to the location of the electronic device at least partially based on the location information or AP list information for the block of the location measurement map.

5. The electronic device of claim 1, wherein the instructions are configured to cause the processor to:
determine at least one position source among position sources of the electronic device at least partially based on the priority information of the position source; and
determine the location measurement method using the determined at least one position source.

6. The electronic device of claim 1, wherein the instructions are configured to cause the processor to determine a final location of the electronic device from at least one piece of location information received by the location measurement method at least partially based on the priority information of the position source included in the block.

7. The electronic device of claim 1, wherein the instructions are configured to cause the processor to determine, when the electronic device is connected to an external device, the location measurement method at least partially based on the priority information of the position source included in the block, the position source information of the electronic device, and/or a position source of the external device.

8. A method of measuring a location of an electronic device, the method comprising:
identifying the location of the electronic device;
determining a block corresponding to the location of the electronic device in a location measurement map at least partially based on the location of the electronic device;
determining a location measurement method at least partially based on priority information of a position source for the determined block and position source information of the electronic device;
measuring a final location of the electronic device using the determined location measurement method;
displaying the location measurement method of measuring the final location of the electronic device as a UI through a display;
identifying, when a movement path of the electronic device is determined, at least one block corresponding to the movement path in the location measurement map;
determining in advance a location measurement method at least partially based on priority information of a position source for a next block in a current block in which the electronic device is located;
measuring a final location of the electronic device in the location measurement method determined in advance when the electronic device is located in the next block; and receiving, when a service cell is changed, a location measurement map corresponding to the changed service cell.

9. The method of claim 8, wherein determining the location of the electronic device comprises identifying the location of the electronic device at least partially based on a Wi-Fi scan operation or a cell ID received from a base station.

10. The method of claim 8, wherein determining the block comprises determining the block corresponding to the location of the electronic device at least partially based on the location information or AP list information for the block of the location measurement map.

11. The method of claim 8, wherein determining the location measurement method comprises:
   determining at least one position source among position sources of the electronic device at least partially based on the priority information of the position source, and
   determining the location measurement method using the determined at least one position source.

12. The method of claim 8, wherein measuring the final location of the electronic device comprises determining a final location of the electronic device from at least one piece of location information received by the location measurement method at least partially based on the priority information of the position source included in the block.

* * * * *